No. 843,140. PATENTED FEB. 5, 1907.
W. F. FOLMER.
CAMERA.
APPLICATION FILED MAY 22, 1905.

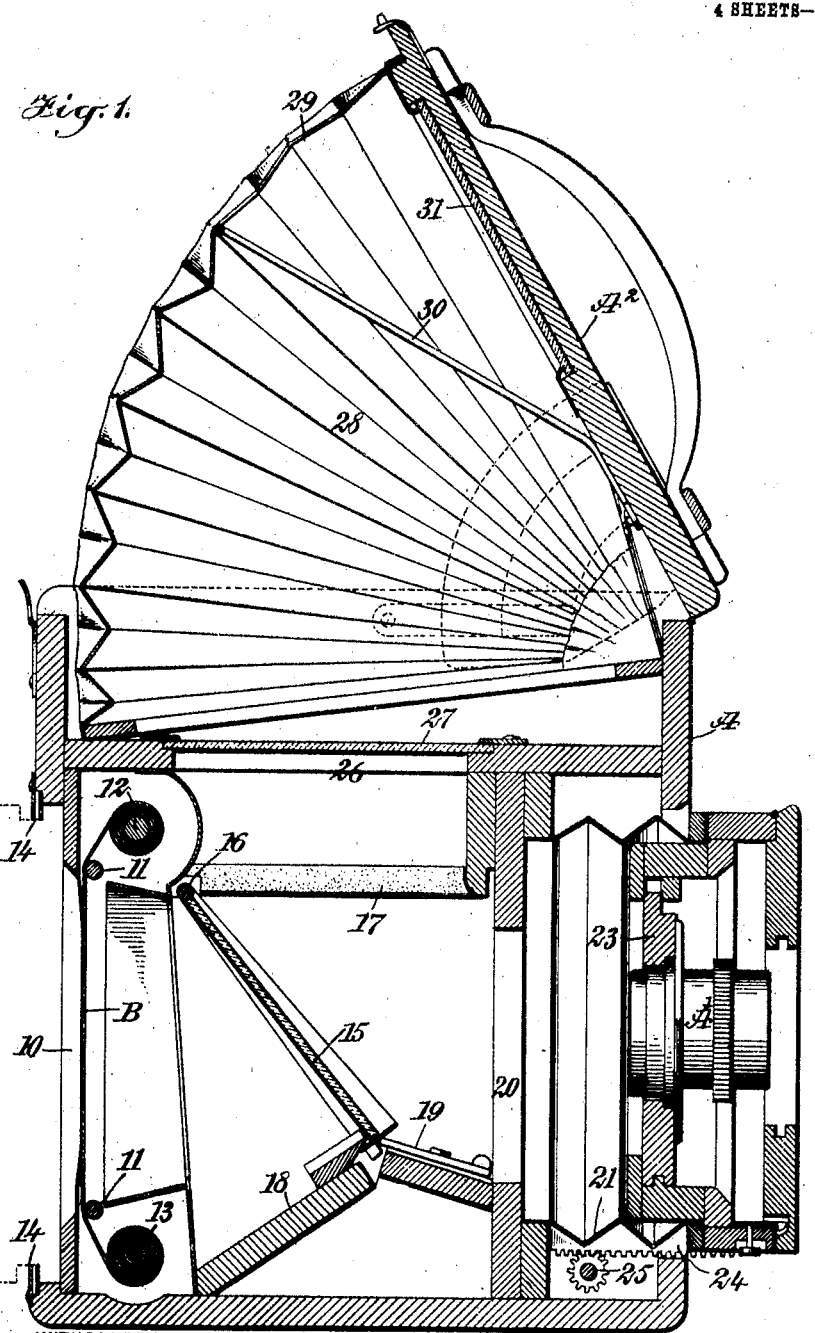

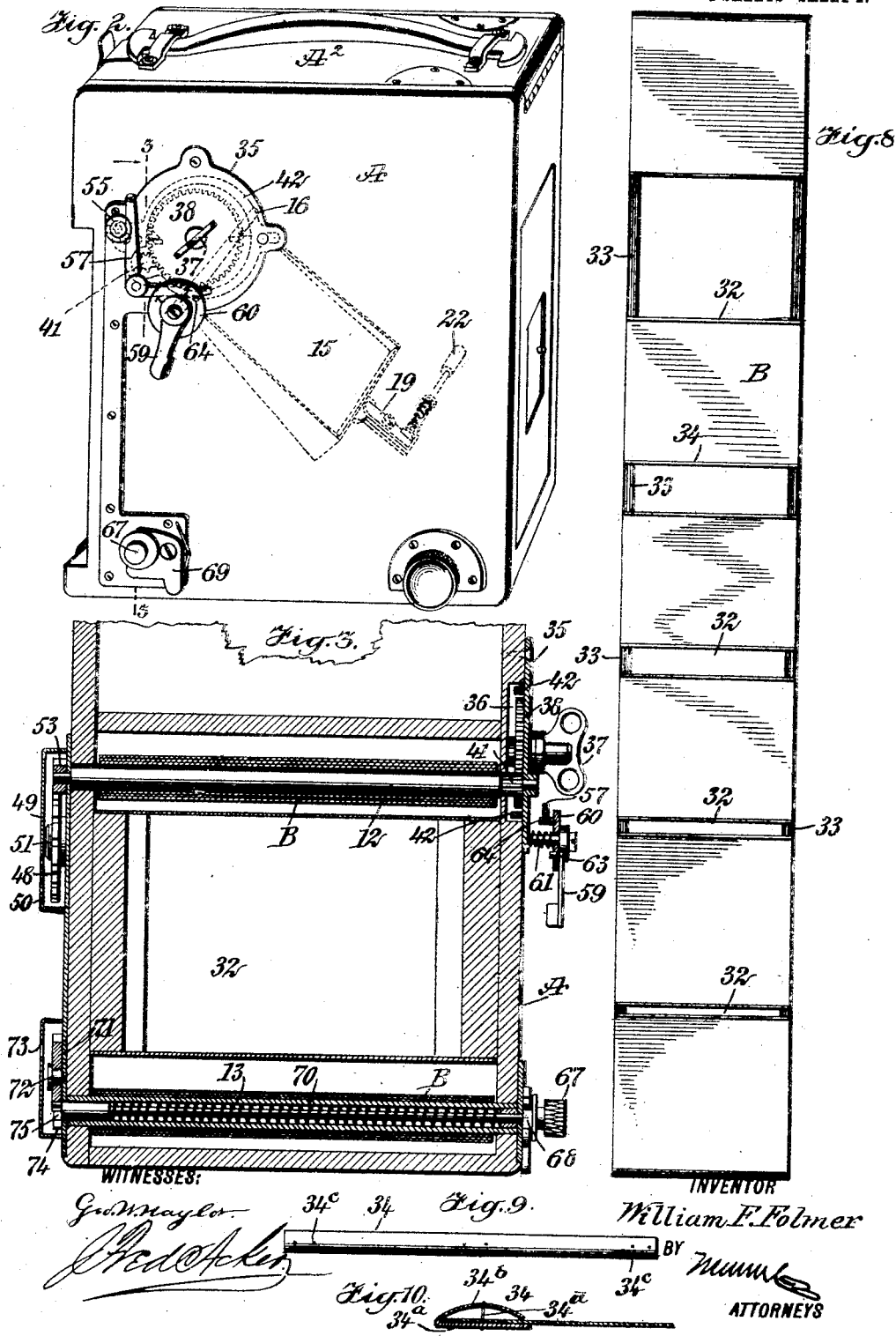

4 SHEETS—SHEET 3.

WITNESSES:

INVENTOR
William F. Folmer
BY
ATTORNEYS

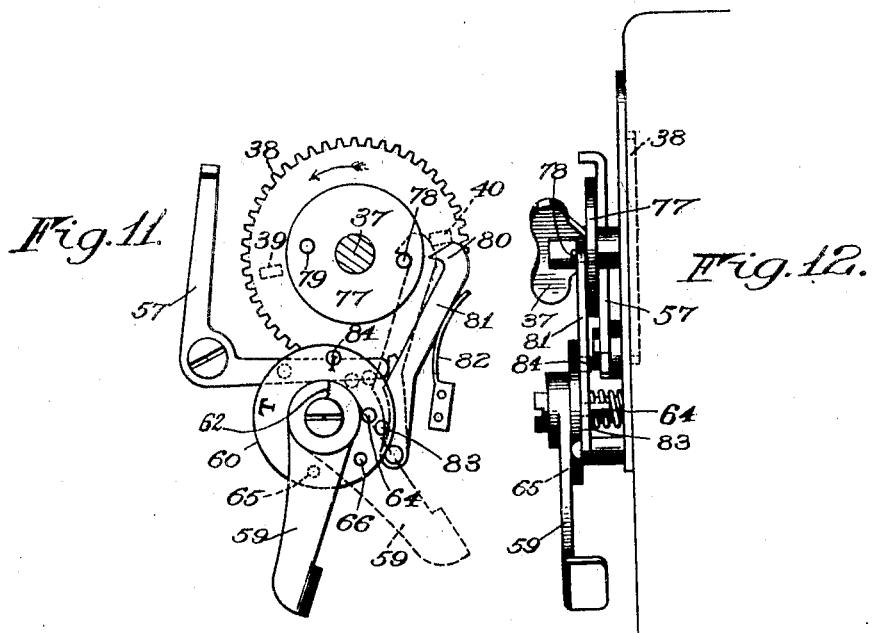

UNITED STATES PATENT OFFICE.

WILLIAM F. FOLMER, OF NEW YORK, N. Y., ASSIGNOR, BY MESNE ASSIGNMENTS, TO FOLMER & SCHWING COMPANY, A CORPORATION OF NEW JERSEY.

CAMERA.

No. 843,140.  Specification of Letters Patent.  Patented Feb. 5, 1907.

Application filed May 22, 1905. Serial No. 261,500.

*To all whom it may concern:*

Be it known that I, WILLIAM F. FOLMER, a citizen of the United States, and a resident of the city of New York, borough of Brooklyn, in the county of Kings and State of New York, have invented a new and useful Improvement in Cameras, of which the following is a full, clear, and exact description.

The purpose of the invention is to provide a special construction of focal-plane shutters in which a plurality of slits or transverse openings are produced having predetermined gradations as to width or depth and to provide mechanism especially adapted to such shutter for setting the same as required, indicating at what point the shutter is set, and releasing the shutter for either instantaneous or time work and for regulating and indicating the tension for the shutter.

Another purpose of the invention is to provide binding-strips for the exposure-openings of the shutter of such construction as not to interfere with the winding of the shutter upon its several rollers, but which will effectually prevent the shutter from buckling at such openings.

A further purpose of the invention is to provide a simple and effective construction whereby it will be impossible to operate the shutter in any manner while the focusing-mirror remains in its upper position or position for exposure, thus preventing an accidental second exposure of the plate through an untimely adjustment of the shutter.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 4:
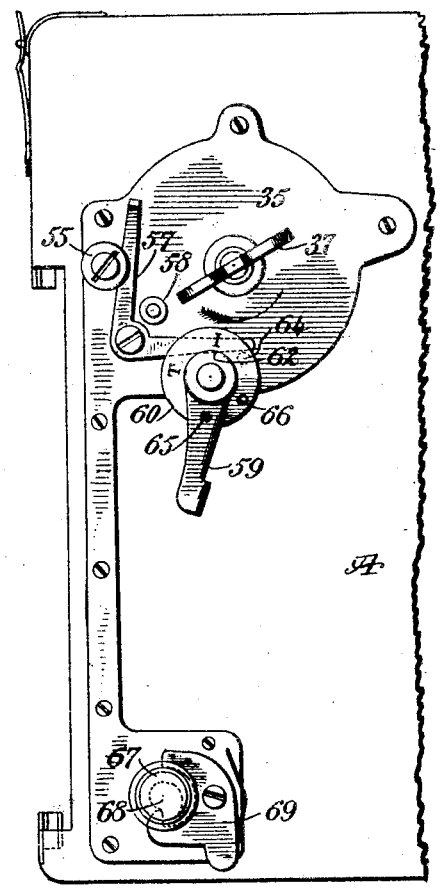
Figure 5:
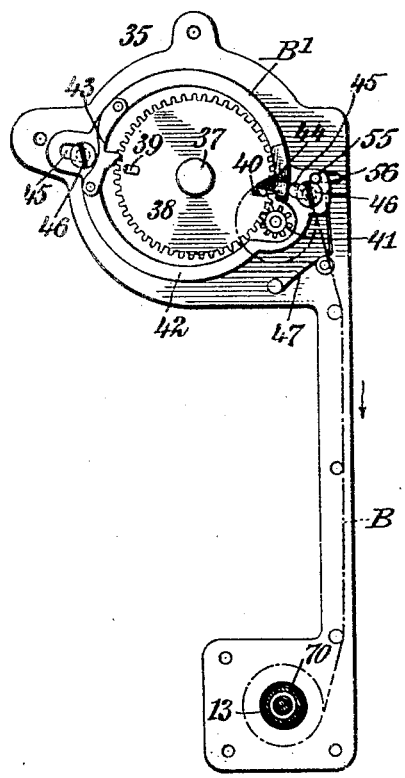
Figure 6:
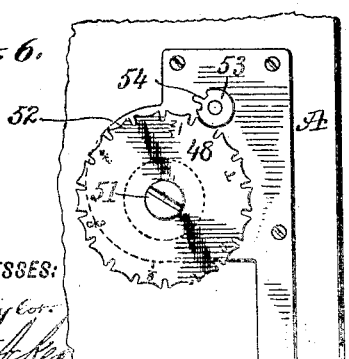
Figure 7:
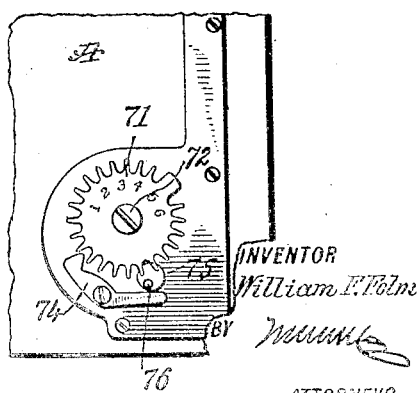

Figure 1 is a vertical section through a camera-box having the improvements applied, the hood being open for focusing. Fig 2 is a perspective view of the improved camera-box, the hood being closed and the view being drawn upon a smaller scale than in Fig. 1. Fig. 3 is a vertical transverse section taken practically on the line 3 3 of Fig. 2. Fig. 4 is an enlarged partial side elevation of the camera-box, illustrating the setting and trip mechanism for the shutter and the means for applying tension thereto. Fig. 5 is an inner face view of the mechanism shown in Fig. 4 and a section through the tension-roller for the shutter. Fig. 6 is an outer face view of the indicating mechanism for the shutter, which indicates the particular opening therein to be next brought into action. Fig. 7 is an outer face view of the tension-indicating device, and Fig. 8 is a plan view of the shutter laid flat. Fig. 9 is a plan view of one of the binding-strips for the side edges of the openings in the shutter. Fig. 10 is a transverse section through the binding-strip and the portion of the shutter to which it is applied, and Fig. 11 is a detail side elevation of an addition to the trip mechanism shown in Figs. 4 and 5 and adapted to prevent the shutter from being operated while the mirror remains out of focusing position. Fig. 12 is a side view of the parts shown in Fig. 11.

A represents a camera-box of any desired size and construction, at the rear of which an exposure-opening 10 is located and over which from top to bottom a curtain-shutter B is passed, engaging with suitable guide-rollers 11. The upper end of the shutter is secured to a winding-roller 12, while the lower end of the shutter is attached to a spring-roller 13 of any desired type, both rollers 12 and 13 being suitably journaled in the sides of the box.

At the rear of the exposure-opening 10 appropriate ways 14 are provided for a plate-holder. The focusing-mirror 15 and its frame are pivoted in the body of the box in front of the exposure-opening 10 and at the rear of the lens A', as is customary. The shaft 16 of the mirror is spring-controlled, as usual, the spring acting when the mirror is released to close the opening 17 in the upper portion of the mirror-chamber. When the mirror 15 is down or in focusing position, it engages in a light-tight manner with a partition 18 at the rear of the inner chamber, rendering the rear of said chamber absolutely light-tight and dark when the mirror is in focusing position, as is indicated in Fig. 1.

The mirror 15 is held locked in focusing position as long as desired by a latch 19, (shown by full lines in Fig. 1 and by dotted lines in Fig. 2,) which latch 19 is pivoted upon a platform located in the inner chamber at the lower end of the opening 20 leading from said chamber to the bellows 21, and the latch 19 is released at any time from the mirror by simply pressing the spring-controlled button 22, connected with the latch and leading out at one side of the camera-box, as is shown by dotted lines in Fig. 2.

A lens-support 23 is operated by means of the usual rack and pinion 24 and 25, and over an opening 26 in the top of the camera-box a ground glass 27 is located. Above the ground glass a bellows focusing-hood 28 is properly connected with the body of the box and the cover $A^2$ of the same.

At the upper rear portion of the hood 28 a sight-opening 29 is produced in the bellows, and this opening 29 is held fully open no matter in what position the hood may be placed, except when the hood is fully closed, and this action is accomplished by a spring-yoke 30, located in the bellows, which yoke is secured at its ends to the under face of the cover $A^2$ and has bearing at its bow-section against a fold in the bellows below the sight-opening. Upon the under face of the cover $A^2$ a mirror 31 is secured.

The curtain-shutter B is shown in Fig. 8 extended or unwound and is preferably composed of a single strip of flexible opaque material having the transverse openings 32 therein of different widths and arranged at different distances apart. The openings 32 in the shutter vary in width from the narrowest at the lower end, where it is attached to the spring-roller 13, to the widest at the upper end, where it is attached to the roller 12, said widest opening being at least as large as the exposure-aperture at the rear of the camera, and the increase in size between the adjacent openings may be upon any desired ratio. The diameter of the rollers 12 and 13 of course varies as the curtain is wound upon them, and they are controlled by gears having a definite rotation for each exposure and for the purpose of making the curtain as short as practicable and at the same time insuring the covering of the sensitized material when the shutter is at rest. The opaque spaces between the openings vary in size—that is, this opaque portion between the widest or time-exposure opening and the next widest or first of the openings for instantaneous exposures is of about equal size to the widest or time opening, while the opaque portions between the narrower or other instantaneous openings is wider. It is impractical to state the exact variation of the opaque portions, as this will vary with the length of the curtain, the size of the rollers, and the width of the openings; but it must be sufficient to cover the plate between exposures and allow an opening to pass each time the roller 12 is rotated a predetermined number of times by its controlling device. This variation in the sizes of the apertures in the shutter in connection with the flap or mirror 15 permits all kinds of exposures to be made—that is, time exposures with full aperture terminated by the movement of the curtain or by the dropping of the mirror, slow or rapid instantaneous with apertures of different widths down to the narrowest width aperture at high speed, all as will be hereinafter described. The upper and largest opening is for time exposure, and the lower and smallest opening is for the most rapid exposure, because it receives the initial action of the spring in the tension-roller. The ends of each opening 32 are defined by tapes 33, suitably connected to the material of the shutter, so that the shutter will wind readily upon its rollers 12 and 13, and the longitudinal edges of the openings 32 in the shutter are protected by thin metal strips 34, which serve to keep the longitudinal edges of the openings in the shutter parallel under all conditions of use. In order that these binding-strips shall not interfere with the proper winding of the curtain-shutter on its rollers and yet be sufficiently stiff to serve the purpose intended, each binding-strip 34 consists of a strip of metal bent longitudinally upon itself to form a flat rear member $34^a$ and a front arched or convexed member $34^b$, and at suitable intervals in both of the members of a binding-strip apertures $34^c$ are made, so that when a binding-strip has received an edge of the shutter between its members $34^a$ and $34^b$ the binding-strip is made fast to the shutter by stitching $34^d$ or the equivalent thereof, the threads being passed through the apertures $34^c$, as is shown in Fig. 10.

On the right-hand side of the camera-box A, adjacent to the rear, a plate 35 is secured over a recess 36 in the box A, as is shown in Fig. 3. A stud 37 is mounted to turn in the plate 35, and a gear-wheel 38 is secured to the inner end of the stud or post, being turned thereby. Upon the inner face of the said gear-wheel 38 studs 39 and 40 are oppositely located adjacent to its periphery. The teeth of the gear-wheel 38 mesh with those of a pinion 41, located at the right-hand end of the winding-roller 12 for the shutter, so that by turning the post 37 the gear 38 will turn the pinion and cause the roller 12 to wind the shutter thereon. The winding mechanism for the roller 12 is controlled by an escapement B', which consists of a ring-body 42, loosely receiving within it the gear 38 and the pinion 41, which ring-body 42 has sliding movement on the plate 35 and is spring-controlled.

The ring-body 42 is provided with opposing fingers 43 and 44, extending over the gear-wheel 38, the upper faces of which fingers are inclined, while their lower faces are flat. The ring-body 42 is provided with opposing slotted lugs 45, and guide-pins 46 extend through the slots into the plate 35. A spring 47 normally holds the ring-body in a forward position, as shown in Fig. 5, or so that the nearest lug 39 or 40, whichever is in that position, will be below the finger 44, so as to prevent the gear-wheel 38 being turned in a wrong direction—that is, to unwind the shutter from the winding-roller 12; but when said gear-wheel 38 is turned in the opposite direction the lugs on the gear 38 will snap by the rear finger 44 of the escapement and in so doing will force the ring-body rearward, and as the engaging lug clears the finger 44 the body 42 will again assume its normal forward position, preventing the gear 38 from being turned backward. At each half-revolution of the gear 38, or just after a lug on the gear has passed the finger 44, an opening 32 in the shutter will have been brought into position for use, and that particular opening will be indicated in advance upon an indicating-wheel 48 at the left-hand side of the camera-box, which wheel is shown in detail in Fig. 6. The operator will therefore continue to wind the shutter until the indicator shows that the desired exposure-opening 32 is in proper position preliminary to exposure. The indications on said wheel shown are "⅛, ⅜, ¾, 1 ½," indicating openings in inches and fractions, the letter "T" indicating that the shutter is set for a time exposure and the letter "O" that the shutter has full opening.

The indicator-wheel 48 is contained within a housing 49 at the left-hand side of the camera-box, as is shown in Fig. 3, which housing is provided with a sight-opening 50, and at such opening figures or letters appear one after the other, and said letters or figures, or both, correspond to and indicate the various sizes of the shutter-openings 32. In the drawings the wheel 48 is shown mounted upon a suitable pivot 51 and is provided with teeth 52, having curved peripheral portions, as also shown in Fig. 6. The wheel 48 is intermittently turned—three teeth at each revolution of the setting-wheel 38—by means of a disk 53, secured to the left-hand end of the winding-roller 12, which disk is provided with a single tooth 54, adapted to enter the spaces between the teeth on the said indicator-wheel 48.

When it is desired to set the shutter in motion for an exposure, the escapement B' must be carried rearward, whereupon the finger 44 is moved from engagement with the rear lug 39 or 40 and the finger 43 is brought under he opposing lug on the said setting-wheel 38, permitting the shutter to unwind to the extent of one-half a revolution of said wheel 38 until one of said lugs 39 or 40 engages, whereupon the escapement is released, and in returning to its first position the finger 43 is carried out of action and the finger 44 is brought into action, and the next movement of the shutter must be a winding one if the same aperture is to be used for the next exposure; but if the next larger aperture is to be used no rewinding is required.

The trip for the shutter, as shown, consists of a stud 55 at the right-hand side of the camera-box A, held to slide in the slot 56 in the plate 35, which stud is secured to the rear end portion of the escapement B'. The shutter-trip 55 is operated by an elbow-lever 57, fulcrumed upon the outer face of the plate 35 adjacent to a stop-roller 58, the vertical member of which lever is always in position to engage with the said trip-stud 55, as is shown in Fig. 4.

For time exposure the trip-lever 57 is operated by the fingers of the right hand; but the arrangement for instantaneous operation is as follows: On the right-hand end of the mirror-shaft 16 a lever-arm 59 is secured, whereby to set the mirror to focusing position, and at such time the lever-arm will extend downward, as is shown in Fig. 4. At the same end of the mirror-shaft 16 a disk 60 is loosely mounted, pressed outward by a spring 61, and upon the outer face of the disk the letters "T" and "I" are produced to indicate, respectively, time and instantaneous work. At the top of the lever-arm 59 a notch or index 62 is made, while a pin 63 is secured to the inner face of the handle portion of the lever 59, as is shown in Fig. 3. Adjacent to the letter "I" a pin 64 is secured upon the disk 60, and opposite the letters "T" and "I" apertures 65 and 66 are made in the disk 60, as is indicated in Fig. 4. When the disk 60 is set for instantaneous work, as is shown in Fig. 4, the pin 64 on the disk 60 will be under the horizontal member of the elbow-lever 57. Therefore when the mirror 15 is tripped and its lever-arm is carried upward and forward the vertical member of the trip-lever 57 will be forced against the trip-stud 55 to operate the same, since the disk will be locked to the lever-arm 59 by the pin 63 on the lever-arm entering the aperture 65 in the disk 60. When a time exposure is to be made, the disk 60 is turned to bring the letter "T" uppermost, carrying the pin 64 on the disk 60 out of the path of the elbow or trip lever 57, and then the pin 63 will have entered the aperture 66 on the disk 60, locking the disk in its new position. The mirror 15 may now be tripped without disturbing the lever 57, which can be operated when desired. It will be understood that in making time exposures in this manner the shutter is set with the indication "T" on the disk 48 exposed, the plate being covered by the shutter and the first pressure on lever 57 bringing the largest opening 32 in position and the second pressure releasing the shutter to cover the plate.

A spring 70 in the tension-roller 13 is wound up by turning a knob 67 at the right-hand end of the shaft of said roller, as shown in Figs. 3 and 4, and adjacent to the said knob a cam 68 is secured to the said shaft, and said cam is engaged by a spring-controlled escapement-pawl, as is best shown in Fig. 4.

At the lower left-hand side of the camera-box an indicating-wheel 71 is mounted on a suitable pivot-pin 72, being contained within a housing 73, and this indicator-wheel 71 is provided with peripheral teeth and with figures reading from "1" to "6," for example, which figures can be read at a suitable sight-opening in the said housing 73. These figures indicate the amount of tension—that is, whether the tension on the roller is much or little—and the teeth of the said indicator-wheel 71 are engaged by a pawl 74, which pawl is likewise engaged by a disk 75, mounted on the left-hand end of the shaft of the tension-controlled roller. Said disk 75 carries a pin 76, which operates intermittently on the teeth of the wheel 71 to turn the same.

While the winding mechanism shown in Figs. 4 and 5 will effectively perform all the functions heretofore assigned to it, the addition shown in Fig. 11 is a very important adjunct, as by its means the shutter cannot be wound upon nless the focusing-mirror is in focusing position, in which position of the mirror light is shut off from the plate. This addition consists in securing a disk 77 upon the stem 37 at the outside of the plate 35, which disk is provided with two opposing pins 78 and 79, which correspond to the lugs 39 and 40 at the inner face of the gear-wheel 38, either one or the other of which pins are engaged, when the focusing-mirror is in an upper position, by the head 80 of the latch-arm 81, pivoted at the outside of the camera-box, being pressed in direction of the pins by a spring 82.

In connection with the foregoing construction the setting-disk 60 is provided with two inwardly-extending extra pins 83 and 84, shorter than the pin 64. Under this arrangement if the disk 60 be turned so that the letter "I" is uppermost, as shown, and the lever-arm 59 is in its lower position (shown by full lines in Fig. 11) the mirror 15 is in focusing position, and the head of the latch-arm 81 will be held out of the path of the pins 78 and 79 by the pin 83 on the setting dial or disk 60 engaging with the latch-arm to press it back, permitting the winding mechanism to be freely operated; but when the lever-arm 59 is being moved to the upper position, (shown in dotted lines in Fig. 11,) carrying the mirror with it, the pin 83 holds the latch-arm 81 out of the path of the pins 78 and 79 until the pin 64 operates the lever 57 to release the shutter and holds said latch out of this path during the rotation of the disk 77, or at least until the pin with which the latch was engaged has moved away from the latch, and as soon as this movement has taken place and during the latter part of the movement of the lever 59 and mirror the pin 83 passes out of engagement with the latch and allows it to be moved by its spring into the path of the pins 78 and 79 to prevent the winding of the shutter until the lever-arm 59 is again carried downward to restore the mirror to its focusing position. The function of the pin 84 is to coöperate with the catch 81 in a similar manner as that above described when the disk 60 is adjusted with the indication "T" in the uppermost position, (or the position occupied by the indication "I" in Fig. 11,) thereby preventing winding the shutter when the mirror is in raised position. As the pin 83, controlling the latch 81 when instantaneous exposures are being made, is located in close proximity to the pin 64, it will be understood that one pin or projection could be employed to perform the functions of both; but it would of necessity be long enough to engage the arm 57. The arrow shown in Fig. 11 indicates the direction of rotation of the disk 77 during the exposure.

It will be understood that with the device described and shown herein the operator is enabled to make successive exposures with uniform aperture by rewinding the shutter after each exposure, or he may vary the speed by adjusting the operating-spring, or he may make a series of exposures with apertures varying in width from the smallest to the largest without rewinding the shutter, or he may vary the speed of the shutter for any of these exposures, or he may by disconnecting the mirror from the shutter-release make time exposures, one movement of the releasing device opening the shutter and the second movement closing it, or he may by running the shutter down until the indication "O" is in position leaving the full aperture make a slow instantaneous exposure by causing the upward movement of the mirror to release the shutter, the pin 64 coöperating with the releasing-lever 57.

Having thus described my invention, I claim as new and desire to secure by Letters Patent—

1. In a camera, a curtain-shutter having a multiplicity of openings of graduated widths, the smallest opening being at the bottom of the shutter, each opening being longitudinally reinforced at its edges with a binding of more rigid material than that of the body of the shutter and having its ends defined by pliable tapes.

2. In a camera, a curtain-shutter having a multiplicity of openings of graduated widths and a covering portion beyond the largest opening, a winding and a tension roller for the shutter and devices for regulating and indicating the tension of the tension-roller, the lower edge of the shutter at which the smallest opening appears being secured to the tension-roller, a winding mechanism for the winding-roller, an indicator for the same roller, and a trip mechanism for the shutter, constituting a portion of the winding mechanism, and means for regulating the trip mechanism for time and for instantaneous exposure.

3. In a camera, a box, a winding-roller and a tension-roller mounted in the box, a curtain-shutter connected with the two rollers, a winding mechanism consisting of a gear, means for turning the gear, a pinion mounted on the shaft of the winding-roller meshing with the gear, opposing lugs carried by the gear, a spring-controlled escapement mounted for movement relative to the gear, and fingers upon the escapement, adapted for alternately engaging the lugs as the escapement is moved in opposite directions.

4. In a camera, a box, a winding-roller and a tension-roller mounted in the box, a curtain-shutter connected with the two rollers, a winding mechanism consisting of a gear, means for turning it, a pinion mounted on the shaft of the winding-roller meshing with the gear, opposing lugs carried by the gear, a spring-controlled escapement which surrounds the gear and pinion, which escapement is mounted for sliding movement, fingers upon the escapement, adapted to alternately engage the lugs to arrest the gear, a trip for the escapement, and means for operating said trip for time or for instantaneous operation of the shutter.

5. In a camera, a box, a winding-roller and a tension-roller mounted in the box, a curtain-shutter connected with the two rollers, a winding mechanism consisting of a gear, means for turning the gear, a pinion mounted on the shaft of the winding-roller meshing with the gear, opposing lugs carried by the gear, a spring-controlled escapement which surrounds the gear and pinion, which escapement is mounted for sliding movement, fingers upon the escapement, adapted to alternately engage the lugs on the gear, as the escapement is moved in opposite directions, a trip for the escapement, means for operating said trip for time or for instantaneous operation of the shutter, an indicator-wheel mounted upon the box, and means carried by the shaft of the winding-roller for operating said indicator-wheel under the control of the winding mechanism.

6. In a camera, a curtain-shutter having a multiplicity of openings of graduated widths, the smallest opening being at the bottom of the shutter, each opening being reinforced at its longitudinal edges with binding-strips of more rigid material than that of the body of the shutter, said binding-strips each consisting of a rear flat member and a front arched member, the material of the shutter being received and secured between the two side members, the said openings having their ends defined by pliable tapes.

7. In a camera, the combination with a box, a winding-roller, a tension-roller, a curtain-shutter connecting the rollers, a winding and release mechanism for the curtain embodying a wheel and a spring-operated escapement coöperating therewith, of a focusing-mirror, a lever for operating it, and a spring-controlled locking-arm for engaging and locking the winding mechanism and adapted to be engaged by the mirror-operating lever when the mirror is being moved out of focusing position.

8. In a camera, the combination with the winding mechanism thereof having projections and a locking-arm adapted for predetermined engagement with said projections on the winding mechanism, of a focusing-mirror, a lever-arm arranged to move the said mirror from a lower focusing to an upper position, said lever-arm being provided with a projection adapted for engagement with the locking-arm to carry said locking-arm out of action when the mirror is in focusing position, permitting the said locking-arm to return to locking position when the focusing-mirror is in its upper position.

9. In a shutter mechanism for cameras, the combination with a casing having an exposure-opening, winding and tension rollers and a curtain-shutter having a plurality of apertures of different widths, the largest being nearest the winding-roller and constituting the full-exposure aperture and covering portions on both sides of the latter, of controlling devices for the winding-roller embodying a rotary disk having fixed stops thereon and an escapement therefor also having fixed projections, said stops and projections being so arranged relative to the apertures in the shutter, that each successive movement of the shutter in one direction will carry one of the narrower curtain-apertures past the exposure-opening and the next movement will bring the full aperture into register with the exposure-opening and arrest the shutter and the next will cover the opening.

10. In a shutter mechanism for cameras, the combination with a casing having an exposure-opening, winding and tension rollers and a curtain-shutter having a plurality of instantaneous-exposure apertures of different widths, a wider full-exposure aperture and covering portions on both sides of the latter, of controlling devices for the winding-roller embodying a rotary disk having fixed stops thereon, an escapement having fixed projections coöperating with the stops, the exposure-opening, the shutter-apertures and disk being so arranged relatively that at each successive release of the escapement one of the narrower instantaneous apertures of the curtain-shutter will pass the exposure-opening and the full-exposure aperture will be arrested when coincident with the exposure-opening and the next release of the escapement will cause the shutter to close said opening.

11. In a shutter mechanism for cameras, the combination with a casing having an exposure-opening, winding and tension rollers and a curtain-shutter having a plurality of instantaneous-exposure apertures of different widths, a wider full-exposure aperture and covering portions on both sides of the latter, of controlling devices for the winding-roller embodying a rotary disk having fixed stops, an oscillatory escapement having fixed projections coöperating with the stops, an automatically-opening cover for the exposure-opening, a catch for retaining it and connections between said cover and the escapement for causing the release of the latter each time the cover is opened.

12. In a shutter mechanism for cameras, the combination with a casing having an exposure-opening, winding and tension rollers and a curtain-shutter having a plurality of instantaneous exposure-apertures of different widths, a wider full-exposure aperture and covering portions on both sides of the latter, of controlling devices for the winding-roller embodying a rotary disk having fixed stops, an oscillatory escapement having fixed projections coöperating with the stops, a cover for the exposure-opening, and connections between said cover and the escapement for causing the release of the latter each time the cover is opened.

13. In a shutter mechanism for cameras, the combination with a casing having an exposure-opening, winding and tension rollers and a curtain-shutter having a plurality of instantaneous-exposure apertures of different widths, a wider full-exposure aperture and covering portions on both sides of the latter, of controlling devices for the winding-roller embodying a rotary disk having stops, an oscillatory escapement having projections coöperating with the stops, a cover for the exposure-opening and adjustable connections between the cover and escapement for causing the release of the shutter by the cover or permitting its independent release.

14. In shutter mechanism for cameras, the combination with a casing having an exposure-opening, winding and tension rollers and a curtain-shutter having a plurality of instantaneous-exposure apertures of different widths, a wider full-exposure aperture and covering portions on both sides of the latter, of controlling devices for the winding-roller embodying a rotary disk having stops, an oscillatory escapement having projections coöperating with the stops, a spring-operated cover for the exposure-opening, a catch for retaining it, and adjustable connections between the cover and escapement for permitting the release of the shutter by the cover or permitting its independent release.

15. The combination with a casing having an exposure-opening, winding and tension rollers and a curtain-shutter having a time-exposure aperture at least as large as the exposure-opening in the casing and a smaller instantaneous-exposure aperture and covering portions on opposite sides of said apertures, of controlling devices for the winding-roller embodying an escapement mechanism, the relation between the rollers, shutter-apertures and escapement being such that after the shutter is set, successive movements of the escapement will release and arrest the shutter before and after the instantaneous-opening has passed the exposure-opening and before and after the time-opening has passed and while it is in alinement with said opening.

16. The combination with a casing having an exposure-opening, an apertured spring-operated shutter movable past said opening, and means for manually actuating it in one direction, of a movable cover for said exposure-opening, a catch for restraining the operating device and connections between said cover and catch to prevent the operation of the actuating device save when the cover is in position to cover exposure-opening.

17. The combination with a casing having an exposure-opening, an apertured spring-operated shutter movable past said opening and means for manually actuating it in one direction, of a movable cover for said exposure-opening, a tripping device for releasing said shutter, adjustable connections between said tripping device and the cover to cause the operation of the former by the latter or permit its independent operation and a catch for restraining the actuating device and operable by the cover to release the actuating device when the latter is either over or away from the exposure-opening.

18. The combination with the casing having an exposure-opening, an apertured spring-operated shutter movable past said opening, means for manually operating said shutter in one direction, a tripping device for said shutter, and a separate retaining-catch therefor, of a member adjustably connected to the cover having a portion adapted to coöperate with the tripping device and portions coöperating with the retaining-catch to hold it out of engagement save at the extremes of movement of the cover.

19. The combination with the casing having an exposure-opening, an apertured spring-operated shutter movable past said opening, means for manually operating said shutter in one direction, a tripping device for the shutter and a separate automatic shutter-retaining device, of a cover for the aperture, a member adjustably connected to said cover having a portion therein for engaging the tripping device and other portions adapted to engage the retaining device for holding it out of engagement save at the extremes of movement of the cover.

In testimony whereof I have signed my name to this specification in the presence of two subscribing witnesses.

WILLIAM F. FOLMER.

Witnesses:
J. FREDK. ACKER,
JNO. M. RITTER.